United States Patent [19]

Bender

[11] Patent Number: 5,749,350
[45] Date of Patent: May 12, 1998

[54] VALUE CONTROL FOR AN INTERNAL COMBUSTION ENGINE

[75] Inventor: Franz Bender, Wendlingen, Germany

[73] Assignee: Mercedes-Benz AG, Stuttgart, Germany

[21] Appl. No.: 792,476

[22] Filed: Jan. 31, 1997

[30] Foreign Application Priority Data

Feb. 1, 1996 [DE] Germany ............... 196 03 592.9

[51] Int. Cl.$^6$ ........................................ F02M 25/07
[52] U.S. Cl. ............................... 123/571; 251/129.11
[58] Field of Search ........................ 123/90.11, 568, 123/569, 571; 251/129.11

[56] References Cited

U.S. PATENT DOCUMENTS

| | | | |
|---|---|---|---|
| 4,064,851 | 12/1977 | Wessel | 123/571 |
| 4,473,056 | 9/1984 | Ishida et al. | 123/571 |
| 4,561,408 | 12/1985 | Jenkins | 123/571 |
| 4,674,464 | 6/1987 | Akagi | 123/571 |
| 4,690,119 | 9/1987 | Makino et al. | 123/571 |
| 4,782,811 | 11/1988 | Hewette et al. | 123/571 |
| 4,915,083 | 4/1990 | Hewette et al. | 123/571 |
| 5,060,910 | 10/1991 | Iwata et al. | 251/129.11 |
| 5,184,593 | 2/1993 | Kobayashi | 123/571 |
| 5,327,856 | 7/1994 | Schroeder et al. | 251/129.11 |
| 5,419,531 | 5/1995 | Hoehn | 251/129.11 |
| 5,606,957 | 3/1997 | Feucht | 123/571 |

FOREIGN PATENT DOCUMENTS

| | | |
|---|---|---|
| 89 06 387 | 7/1989 | Germany. |
| 43 43 318 | 6/1994 | Germany. |
| 2 101 715 | 1/1983 | United Kingdom. |

*Primary Examiner*—Willis R. Wolfe
*Attorney, Agent, or Firm*—Klaus T. Bach

[57] ABSTRACT

In a valve control for an internal combustion engine, particularly an exhaust gas recirculation valve comprising a valve with a valve stem and a valve disc axially movably supported in a housing for moving the valve disc out of, and into, seating engagement with a valve seat for opening and closing a gas flow passage, a rotary magnet structure with a motion transmitting mechanism is provided with an actuator arrangement for converting rotation of the rotary magnet to axial motion of the valve member by way of a cam track structure disposed between means rotating with the rotary magnet arrangement and a valve guide supporting the valve for only axial movement from and onto the valve seat.

20 Claims, 2 Drawing Sheets

VALUE CONTROL FOR AN INTERNAL COMBUSTION ENGINE

BACKGROUND OF THE INVENTION

The invention relates to a valve control for an internal combustion engine, especially for an exhaust-gas recirculation valve.

G 89 06 387.2 U1 discloses a magnetic valve control for a bellows pump, in which an electrically activatable rotary magnet is provided in the housing, the rotary magnet transmitting its rotational movement to an actuator arrangement. The actuator arrangement has a shaft which is connected to the rotary magnet and which has an eccentrically mounted cam disc at the end located opposite the rotary magnet, in order to activate a bellows and, respectively, valves.

Such an arrangement however takes up a large amount of construction space, since a right-angled arrangement is required between the shaft axis and the valves, so that the rotational movement of the shaft can be converted into a lifting movement.

Furthermore, DE-A 43 42 318 A1 disclosed a valve control for a swashplate compressor, in which a rotational movement of an electrically activatable rotary magnet can be converted into a lifting movement of a valve tappet.

The swashplate compressor has a drive shaft which passes through a swashplate chamber and which is rotated by means of an electromagnetic coupling connected to the drive shaft. The shaft is provided with a conversion mechanism for converting the rotational movement of the shaft into a reciprocating movement of each of the pistons or valves in a corresponding cylinder bore, so that an intake stroke and an exhaust stroke are executed alternately in the cylinder bore. By virtue of a magnetic field which is generated as a result of the electrical energization of the electromagnet, the valve body together with its tappet is attracted magnetically by the end face of the shaft. The valve body can thereby be brought into an open position. When the electromagnet is deenergized, the valve body is moved in the direction of the closing position by virtue of a force generated by a coolant flowing from the swashplate chamber into the intake chamber.

However, such a valve control of a rotary magnet, which converts a rotational movement generated by electrical energization into a lifting movement of the valve body, has the disadvantage that an exactly definable lifting movement can not be achieved, since the tappet of the valve body is guided freely in the shaft. In particular, an opening and closing movement of the valve body during the intake stroke and outlet stroke must be assisted by a pressure differential. Such an activation of the valve body allows either an opening position or a closing position of the valve body, but specific settings within an opening and a closing range can not be achieved.

It is therefore the principal object of the invention, to provide a valve control for an internal combustion engine valve, in which a rotational movement generated by an electrical rotary magnet can be converted into a defined lifting movement for controlling a valve disc, in order thereby to control the flow of a medium.

SUMMARY OF THE INVENTION

In a valve control for an internal combustion engine, particularly an exhaust gas recirculation valve comprising a valve with a valve stem and a valve disc axially movably supported in a housing for moving the valve disc out of, and into, seating engagement with a valve seat for opening and closing a gas flow passage, a rotary magnet structure with a motion transmitting mechanism is provided with an actuator arrangement for converting rotation of the rotary magnet to axial motion of the valve member by way of a cam track structure disposed between means rotating with the rotary magnet arrangement and a valve guide supporting the valve for only axial movement from and onto the valve seat.

By using as a lifting device an actuator arrangement with a cam track, the rotational movement initiated by the rotary magnet as a function of its energization can be converted into a lifting movement, in which the amount of the lift can be set as a function of a pitch of the cam track. In this case, the rotational movement is converted via the cam track of the lifting device into a lifting movement by which the valve disc is directly actuated. As a result, in the case of an exhaust-gas recirculation valve for example, the valve can be set to any position between the closing and the opening position. If a medium exerts a constant pressure on the valve disc acts, particularly immediately adjacent a closing position, the valve may oscillate, with the result that the valve disc, although seated on the valve seat, may generate a considerable amount of unpleasant noise which also results in damage to the valve seat. Vibrations of this kind can be prevented by the positive positioning of the valve disc by means of the cam track.

Furthermore, higher opening forces and closing forces can be accommodated. Due to the positive guidance of the cam track, a valve with a relatively large flow cross-section can be provided since the forces acting on the valve operating mechanisms are reduced by means of the cam track. This makes it possible to provide a valve control which allows reliable closing and opening of the valve disc against high forces.

Preferably, there is an axial guide structure disposed between the lifting device and a housing-mounted guide structure. Then, the lifting device can be supported so as not to rotate about an axis about which the rotary magnet rotates to activates the valve. With this arrangement, the rotational movement of the rotary magnet is converted into an axial movement on the lifting device via the cam track. The axial guide is advantageously designed as a longitudinally grooved bearing, so that it is possible to insure low friction for an actuator arrangement.

There may further be a threaded cam track which, in the closing range, has a very low pitch which merges towards the opening range into a high pitch. This makes it possible to insure that the high forces occurring in the closing range can be overcome. It permits to provide a fine setting, in which the valve disc is opened only by a small gap in relation to a valve seat. With this embodiment, a rapid actuating movement of the valve disc can be effected in the open end range, so that the corresponding load conditions can be rapidly set and regulated. Moreover, the pitch gradient of the cam track may be adapted to various valve flow cross-sections, so that, on one hand, the necessary forces, in particular for the closing movement, can be transmitted and, on the other hand, the actuating speeds of the valve disc are as high as possible.

Preferably, the valve stem fixed in the guide relative to the housing so as to permit only axial movement and the valve stem has a valve-stem seal between the valve disc and the end of the guide. As a result, no dirt particles and no soot can contaminate the valve stem and the guide element thereby providing for reliable operation and a long valve operating life.

Also, preferably the rotary magnet is biased into a valve closing position by means of a spring element. Then the valve control meets the highest safety requirements, since the valve control will automatically close in case of failure. It avoids a situation where, with a residual annular gap at the valve seat, the exhaust-gas recirculation pipe may become red hot, resulting in component destruction.

In another advantageous embodiment of the invention, a magnetic circuit for activating the rotary magnet has a temperature compensation means and a further resistor. To this end, a current control arrangement is provided, in which the rotary magnet and, for example, a parallel circuit of an NTC resistor and of a further resistor are connected in series, with the result that the total resistance remains the same, irrespective of temperature fluctuations which may be caused by the energization of the coil of the rotary magnet.

In still a further advantageous embodiment of the invention, the rotary magnet is coupled to a position transmitter determining lifting position and/or a rotary angle position. This arrangement allows for feedback regarding the set lifting position and/or rotary angle position, so that for example an engine management unit can acquire the data necessary for monitoring and controlling the actuator arrangement and, if appropriate, can transmit new signals for readjustment or resetting depending on to the instantaneous load state. The advantage of sensing the rotary angle position rather than the valve lift position is that a better resolution of the sensor values is obtained.

Advantageous embodiments of the invention will be described below on the basis of the accompanying drawings.

DESCRIPTION OF PREFERRED EMBODIMENTS

Figure 1:
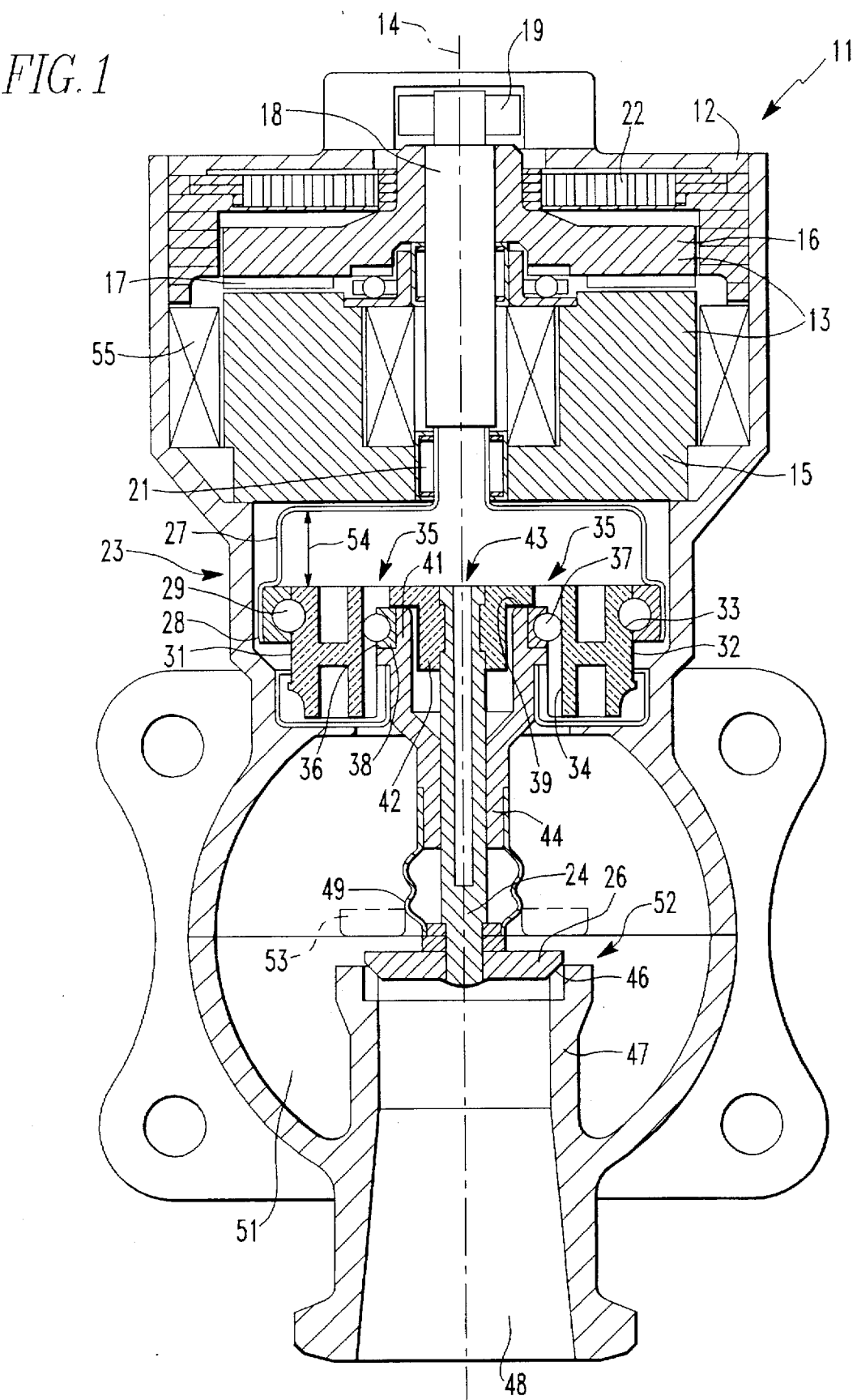
FIG. 1 is a diagrammatic cross-sectional view of an exhaust-gas recirculation valve with a valve control according to the invention.

FIG. 1 is a full cross-sectional view of an exhaust-gas recirculation valve 11 for an internal combustion engine, which has a valve control according to the invention. Arranged in a housing 12 is a rotary magnet 13 which has a stator with two coil bodies in the form of a segment of a circle. The rotary magnet 13 includes a rotor 16 with permanent magnets 17 disposed in rotationally symmetry about a longitudinal center-axis 14 of the exhaust-gas recirculation valve 11. The rotor is supported for rotation with the centrally arranged shaft 18. The shaft 18 is supported in an upper housing portion by a bearing 19 and, on the stator 15 by a bearing 21. Between an upper housing wall and the rotor 16, there is provided in the housing 12 a helical return spring 22 which is at one end fixed to the housing and is arranged at the other end, to the rotor 16. As a helical spring, the spring 22 can be installed in a narrow axial space.

An actuator arrangement 23 is disposed adjacent one end of the shaft 18 next to the bearing 21.

This actuator arrangement 23 has a pot-shaped drive element 27 which is mounted on the shaft 18 for rotation therewith. The drive element 27 has, at its free end facing downwardly as shown in FIG. 1, an annular element 28 which is supported for rotation with the drive element 27 in a receptacle provided for this purpose. Three balls 29 are arranged in the annular element 28, distributed uniformly over the circumference thereof. The annular element 28 has recesses which retain the balls 29 at fixed locations. The balls 29 are arranged in the receptacles so as to rotate freely.

The drive element 27 surrounds, at least partially, a lifting device 31 which has an outer surface 32 with an axial cam track 33. The balls 29 run in this cam track 33. The lifting device 31 is thereby connected positively to the drive element 27. In order to achieve a lifting movement when the drive element 27 is rotated, the lifting device 31 has a guide portion 34 which, with a guide means 36 fixed relative to the housing, forms an axial guide track 35. The lifting device 31 can thus be supported so as not to be rotatable relative to the guide means 36, the guide means 36 being arranged co-axially with the longitudinal center-axis 14. The guide portion 34 of the lifting device 31 includes axial grooves in which, in turn, balls 37 are arranged. These balls 37 are held by the guide means 36 in a spatially fixed fashion, in a cage-like annular element 38. These balls 37 can also be arranged distributed uniformly over the circumference. Ball elements of ball bearings or the like are advantageously used for this.

In a region near to the longitudinal center-axis 14, the lifting device 31 has an annular recess 39 in which the free ends 41, of the guide 36 are arranged adjacent to the lifting device 31. With the groove-shaped recess 39, a shoulder is formed which bears against the free ends 41 of the guide means 36 and limits a downward movement. At the same time, the annular recess 39 forms a collar 42 around a bore 43 in the longitudinal center-axis 14 of the lifting device 31, wherein a valve stem 24 is arranged. This provides for support and guidance of the valve stem 24.

The guide means 36 is Y-shaped in cross-section with free ends 41 and forms a valve guide 44 opposite the free ends 41.

A valve disc 26 is arranged at the end of the valve stem 24. The valve disc 26 is shown seated on a valve seat 46 which is formed at the end 47 of an exhaust-gas recirculation inlet 48. An exhaust-gas recirculation conduit (not shown) is connected to the exhaust-gas recirculation inlet 48. A bellows-like valve-stem seal 49, is provided between the valve disc 26 and the valve guide 44. The guide means 36 can thereby be kept free of dirt. Alternatively, a conventional valve-stem seal can be provided.

The exhaust-gas recirculation inlet 48 projects with its end 47 into an intake duct 51 of a suction system of the internal combustion engine, via which intake duct fresh air is supplied to the internal combustion engine. The end 47 projects approximately up to the center-axis of the intake duct 51. The advantage of this is that short mixing zones are provided, with the result that a uniform distribution of exhaust gas in the fresh-air stream is insured.

The cam track 33 of the lifting device 31 is round in cross-section, for receiving the balls 29. Other shapes may be provided however, such as, a trapezoidal groove to form the cam track. In the case of a valve disc closing position 52, the cam track 31 has a relatively low pitch. As a result, only a small lifting movement is executed for a particular amount of rotation of the rotary magnet. Relatively high axial forces can thereby be generated. At the same time, a lifting travel of less than 1 mm can accurately controlled, because the valve stem is prevented from oscillating as a result of the positive conversion of the rotational movement into a lifting movement by means of the actuator arrangement 23.

The cam track 33 is designed in such a way that no self-locking occurs, so that no excessively high releasing moment has to be overcome. Moreover, the advantage of this low pitch is that, for example when the internal combustion engine is in a full-load mode in which the valve disc 26 is closed, the high pressures of the exhaust-gas return, which may amount, for example, to 4 to 5 bar, can be accommodated. The very low pitch in this end range also reliably prevents opening of the valve disc 26 by the exhaust gas pressure as the return spring 22 which acts via the shaft 18 on the lifting device 31, holds the valve disc 26 in a closing position 52. This is insured even when the rotary magnet 13 not energized.

Furthermore, the cam track 33 of the lifting device 31 can be of a multi-track design. Moreover, it is also possible to provide, instead of the balls 29, further sliding elements which allow the lifting device 31 to be guided positively in the drive element 27. In this case, the pitch of the cam track 33 is designed in such a way that the necessary maximum lift can be obtained with a rotational movement which is still achievable by the rotor. For example, a lifting movement of up to 10 mm can be provided for with a rotation angle of up to 170°, in particular up to 90°. In this case, the lifting distance is to be adapted to the cross-section of the exhaust-gas recirculation inlet 48 and the valve flow cross-section when the valve is fully open. It is, of course, necessary to provide sufficient space in the drive element 27 between the top edge of the lifting device 31 and a pot-shaped bottom of the drive element 27 to accommodate the lifting distance 54.

The exhaust-gas recirculation valve 11 works as follows:

The valve disc 26 is held in the closing position 52 on the valve seat 46 by the return spring 22. When the exhaust-gas recirculation valve 11 is to be opened, for example when the internal combustion engine is idling, the valve disc is moved to an opening position 53. In this case, the rotary magnet 13 becomes energized. The electrical energization of the coils generates a magnetic field which causes rotation of the permanent magnet 17. This rotation is transmitted to the drive element 27 by way of the shaft 18. The lifting device 31 is moved vertically for a corresponding lifting distance 54 by means of the cam track 33 and the axial guide 35. As soon as the internal combustion engine is operated at a higher load, the valve disc 26 is rotated in the opposite direction resulting in a valve closing movement.

With the arrangement according to the invention which uses for the exhaust-gas return valve 11 a rotary magnet 13, a low overall height can be achieved in comparison with lifting magnets used for the control of prior art exhaust-gas recirculation valves. Consequently, the arrangements have smaller effective lever arms with a more favorable center of gravity close to the support resulting in a lower vibration load.

In the embodiment described with regard to FIG. 1 the cam track 33 and axial guide 35 could be interchanged so that an inner cam track 33 and an outer axial guide 35 can be provided on the lifting device 31.

Figure 2:
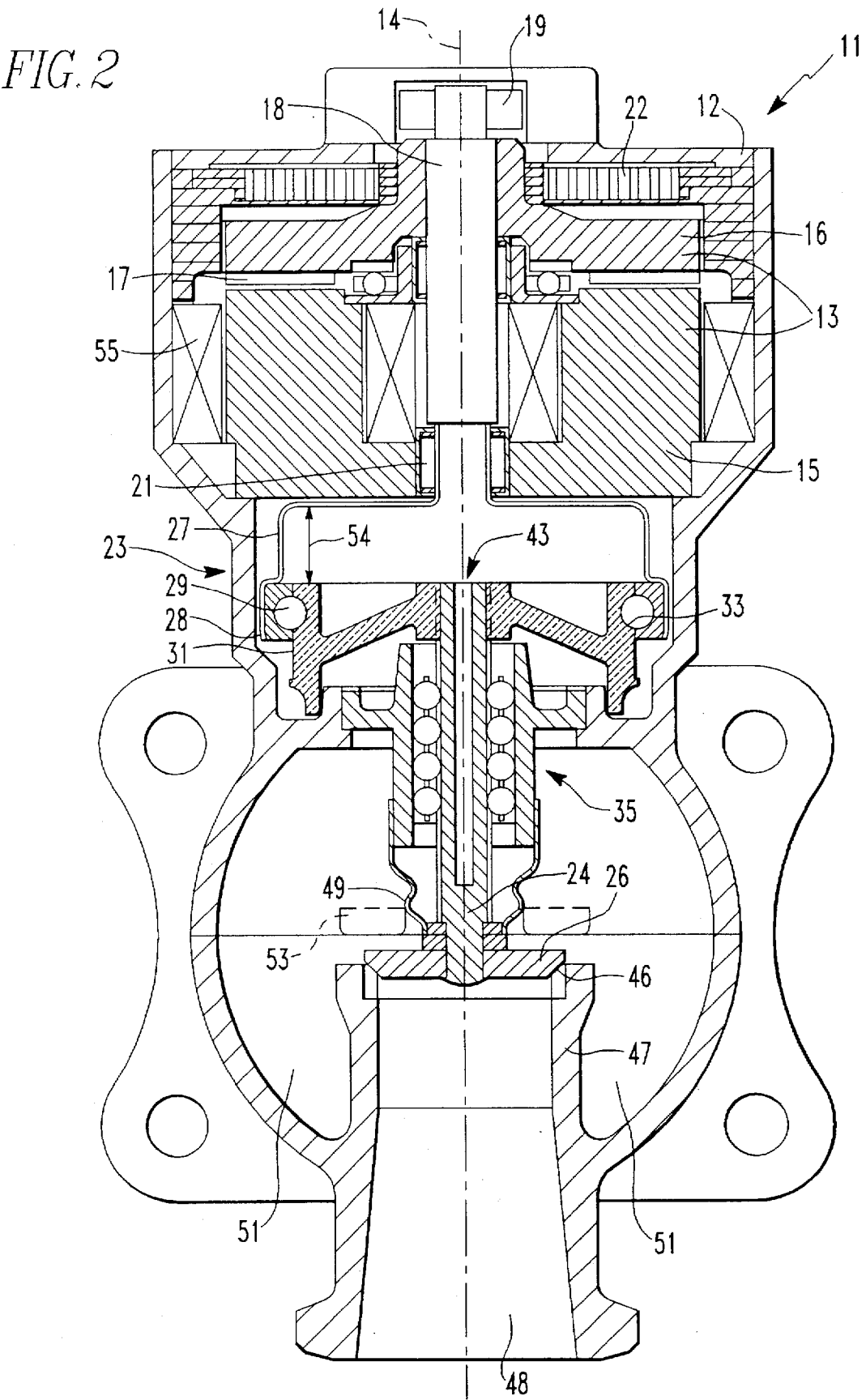
FIG. 2 is a diagrammatic cross-sectional view of an alternative embodiment.

FIG. 2 is a cross-sectional view of an alternative embodiment. Only the differences from the embodiment in FIG. 1 are discussed below. The exhaust-gas recirculation valve 11 has as an axial guide 35 a longitudinally grooved axial bearing which cooperates with the valve stem 24. This axial bearing 35 is fixed relative to the housing. By the use of an axial bearing, the lifting device 31 is arranged fixed in terms of rotation relative to the housing 12 via the valve stem 24, which provides for a simpler design of the lifting device 31. The lifting device 31 can be greatly simplified by the use of the longitudinally grooved axial bearing 35, as becomes clear in comparison with the lifting device in FIG. 1. A reduction in the bearing points can also be achieved.

Moreover, instead of sliding friction, rolling friction is employed, with the result that an easily operable arrangement is provided. The remaining components are designed in a similar way to those of the embodiment of FIG. 1.

The lifting device 31 preferably consists of a plastic material and can be made by injection molding.

A design of this type with an electrical rotary magnet and with an actuator arrangement according to the invention, which converts a rotational movement into a lifting movement, can be employed also for other uses. Thus, the actuator arrangement according to the invention can be provided for example in place of a pressure cell (in the case of a self-regulating exhaust-gas turbocharger) or in place of a vacuum cell (in the case of a characteristic-regulated exhaust-gas turbocharger), for waste-gate control or for a control of VTG superchargers for the purpose of setting the blade position of variable guideblades in turbochargers.

In a further embodiment of the invention, the polarity of the rotary magnet 13 can be reversed, thereby making it possible to actively close the valve disc 26. The closing movement is assisted by the spring force of the return spring 22.

The valve 11 is actuated utilizing the keying ratio of a magnetic coil 55, wherein a low keying ratio is utilized by the electronic control system for for a small openings of the valve 11 and a high keying ratio is utilized for large openings of the valve 11.

What is claimed is:

1. A valve control for an internal combustion engine, particularly for an exhaust gas recirculation valve, comprising a housing a valve member having a valve disc and a valve guide structure including a valve stem axially movably supported for moving said valve disc out of, and into, seating engagement with a valve seat for opening and closing a gas flow passage, a rotary magnet arrangement supported in axial alignment with said valve member, and a motion transmitting mechanism including an actuator arrangement for converting rotation of said rotary magnet arrangement to axial motion of said valve member, said actuator arrangement comprising a cam track structure disposed between a rotatable structure connected for rotation with said rotary magnet arrangement and said valve guide for axially moving said valve stem and, together therewith, said valve disc away from, and onto, said valve seat.

2. A valve control according to claim 1, wherein axial guide means are provided between said valve stem and a structure connected to said housing and surrounding said stem for axially guiding said valve.

3. A valve control according to claim 2, wherein said axial guide means is a linear bearing including axial grooves for engagement between said housing structure and said valve guide structure.

4. A valve control according to claim 1, wherein said motion transmitting mechanism includes a drive element connected for rotation with said rotary magnet arrangement and to said cam track structure.

5. A valve control according to claim 4, wherein said drive element is a pot-shaped member which at least partially surrounds said cam track structure.

6. A valve control according to claim 5, wherein said drive element includes guide elements supported in an annular element connected to said drive element said guide elements cooperating with said cam-track for axially moving said guide structure.

7. A valve control according to claim 4, wherein said drive element includes at least one threaded portion which is movable relative to said cam track of said actuator arrangement.

8. A valve control according to claim 1, wherein said cam track is of a thread-like design.

9. A valve control according to claim 1, wherein said cam track is of a multiple thread-like design.

10. A valve control according to claim 1, wherein said cam track has a smaller pitch in the closed-valve area than it has in an open-valve area.

11. A valve control according to claim 1, wherein said actuator arrangement comprises said valve stem and guide means for axially guiding said valve stem.

12. A valve control according to claim 1, wherein a valve stem seal is disposed between said valve guide and said valve stem adjacent said valve disc.

13. A valve control according to claim 12, wherein said valve stem seal comprises a bellows structure.

14. A valve control according to claim 1, wherein said cam track has a pitch which is adapted to the rotary angle, the maximum valve lift and the diameter of the actuator arrangement.

15. A valve control according to claim 1, wherein said rotary magnet arrangement is rotatable within a 170° range and the rotation can be achieved depending on the cross-section of the recirculation gas passage and the flow cross-section of said valve when fully open, said valve having a maximum opening stroke of 10 mm.

16. A valve control according to claim 1, wherein said rotary magnet arrangement includes a permanent magnet rotatably supported and activatable in clockwise and counter-clockwise direction by polarity reversal.

17. A valve control according to claim 1, wherein a return spring is provided for returning said rotary magnet arrangement to a valve closing position when said magnet arrangement is deenergized.

18. A valve control according to claim 1, wherein said rotary magnet structure is controllable by a control circuit including a circuit in parallel with said rotary magnet structure and including an NTC resistor and a further resistor.

19. A valve control according to claim 1, wherein said actuator arrangement includes at least one compensating element for compensating play in said cam track.

20. A valve control according to claim 1, wherein said valve control is used for the control of the guide blades in an exhaust gas turbocharger.

* * * * *